United States Patent
Yamazaki

(10) Patent No.: US 12,105,999 B2
(45) Date of Patent: Oct. 1, 2024

(54) PRINT MANAGEMENT SYSTEM, PRINT MANAGEMENT METHOD, AND NON-TRANSITORY COMPUTER-EXECUTABLE MEDIUM

(71) Applicant: Masataka Yamazaki, Kanagawa (JP)

(72) Inventor: Masataka Yamazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/198,846

(22) Filed: May 18, 2023

(65) Prior Publication Data
US 2023/0376258 A1 Nov. 23, 2023

(30) Foreign Application Priority Data

| May 19, 2022 | (JP) | 2022-082094 |
| Nov. 29, 2022 | (JP) | 2022-190480 |
| Apr. 11, 2023 | (JP) | 2023-064158 |

(51) Int. Cl.
*G06F 3/12* (2006.01)

(52) U.S. Cl.
CPC .......... *G06F 3/1255* (2013.01); *G06F 3/1208* (2013.01); *G06F 3/1222* (2013.01); *G06F 3/1239* (2013.01); *G06F 3/1288* (2013.01)

(58) Field of Classification Search
None
See application file for complete search history.

(56) References Cited

U.S. PATENT DOCUMENTS

| 2010/0238495 A1* | 9/2010 | Sugimoto | G06F 3/1222 358/1.15 |
| 2011/0191846 A1* | 8/2011 | Yamada | G06F 21/00 726/21 |
| 2013/0128313 A1 | 5/2013 | Hirokawa et al. | |
| 2018/0351742 A1 | 12/2018 | Yamazaki et al. | |

FOREIGN PATENT DOCUMENTS

| JP | 2001-228983 | 8/2001 |
| JP | 2002-116897 | 4/2002 |
| JP | 2017-107403 | 6/2017 |

* cited by examiner

*Primary Examiner* — Darryl V Dottin
(74) *Attorney, Agent, or Firm* — XSENSUS LLP

(57) ABSTRACT

A print management system includes a cloud storage server and an information processing apparatus. The cloud storage server includes a memory that stores a print permission/prohibition condition, a usage amount of consumables used in printing an internal document for each employee of the each entity, and a completion status of a requested amount of the printing based on the usage amount for the each employee. The information processing apparatus includes circuitry to execute a print material determination application to: determine whether a print material is permitted to be printed as the internal document; execute the printing job of the print material according to a result of determination; store the usage amount by the printing job in the cloud storage server; provide a record relating to the requested amount of the printing; and store the completion status of the requested amount of the printing in the cloud storage server.

14 Claims, 6 Drawing Sheets

PRINT MANAGEMENT SYSTEM, PRINT MANAGEMENT METHOD, AND NON-TRANSITORY COMPUTER-EXECUTABLE MEDIUM

CROSS-REFERENCE TO RELATED APPLICATIONS

This patent application is based on and claims priority pursuant to 35 U.S.C. § 119(a) to Japanese Patent Application Nos. 2022-082094, filed on May 19, 2022, 2022-190480, filed on Nov. 29, 2022, and 2023-064158 filed on Apr. 11, 2023, in the Japan Patent Office, the entire disclosure of which is hereby incorporated by reference herein.

BACKGROUND

Technical Field

Embodiments of the present disclosure relate to a print management system, a print management method, and a non-transitory computer-executable medium.

Related Art

With recent changes in working styles, cases of working from home are increasing. Conventionally, internal documents are printed while working in an office. When printing is to be performed at home, if there is a printer provided by a company, the provided printer is used for printing. If there is no printer provided by a company, printing is performed using a printer owned by an individual or printing is performed at an office when the individual works at the office.

SUMMARY

An embodiment of the present disclosure includes a print management system. The print manage system includes a cloud storage server and an information processing apparatus. The cloud storage server includes a memory that stores a print permission/prohibition condition that is set for each entity and indicates whether a print material is permitted to be printed as an internal document, a usage amount of consumables used in printing the internal document for each employee of the each entity, and a completion status of a requested amount of the printing based on the usage amount for the each employee. The information processing apparatus includes circuitry to execute a print material determination application to: determine whether the print material is permitted to be printed as the internal document according to the print permission/prohibition condition stored in the cloud storage server in response to a request to execute a printing job of the print material; execute the printing job of the print material according to a result of determination indicating that the print material is permitted to be printed as the internal document; store the usage amount by the printing job in the cloud storage server; provide a record relating to the requested amount of the printing according to the usage amount stored in the cloud storage server; and store the completion status of the requested amount of the printing in the cloud storage server.

An embodiment of the present disclosure includes a print management method performed by an information processing apparatus. The method includes determining whether a print material is permitted to be printed as an internal document according to a print permission/prohibition condition stored in a cloud storage server including a memory, the print permission/prohibition condition being set for each entity and indicating whether the print material is permitted to be printed as the internal document, in response to a request to execute a printing job of the print material. The method includes executing the printing job of the print material, when the determining determines that the print material is permitted to be printed as the internal document. The method includes storing a usage amount of consumables by the printing job in the cloud storage server. The method includes providing a record relating to a requested amount of printing according to the usage amount stored in the cloud storage server. The method includes storing a completion status of the requested amount of the printing in the cloud storage server.

An embodiment of the present disclosure includes a non-transitory computer-executable medium storing a program causing a computer to perform a method. The method includes determining whether a print material is permitted to be printed as an internal document according to a print permission/prohibition condition stored in a cloud storage server including a memory, the print permission/prohibition condition being set for each entity and indicating whether the print material is permitted to be printed as the internal document, in response to a request to execute a printing job of the print material. The method includes executing the printing job of the print material, when the determining determines that the print material is permitted to be printed as the internal document. The method includes storing a usage amount of consumables by the printing job in the cloud storage server. The method includes providing a record relating to a requested amount of printing according to the usage amount stored in the cloud storage server. The method includes storing a completion status of the requested amount of the printing in the cloud storage server.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
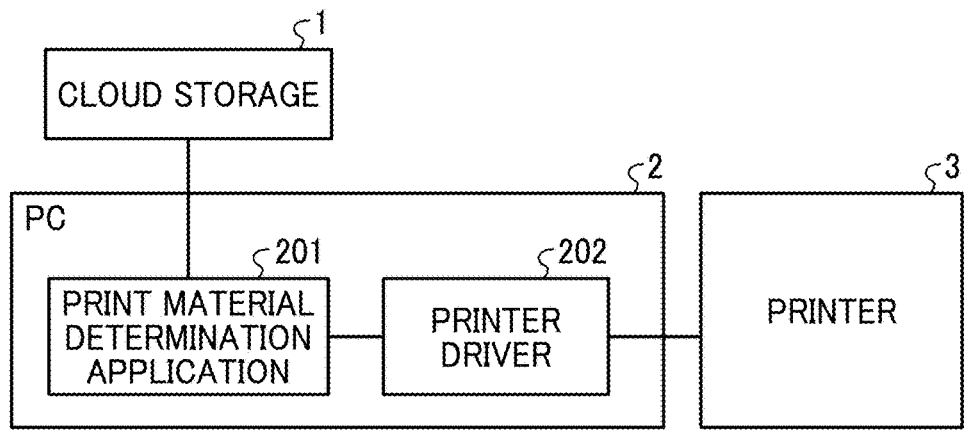
FIG. 1 is a block diagram illustrating an example of a configuration of a print management system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of a print management system, a print management method, and a program are described in detail.

FIG. 1 is a block diagram illustrating an example of a configuration of a print management system according to the present embodiment. As illustrated in FIG. 1, the print management system according to the present embodiment includes a cloud storage 1, a personal computer (PC) 2, and a printer 3. The cloud storage 1 is an example of a cloud storage server. The user can use the print management system by changing means of printing when the user wants to print an internal document and when the user prints a personal document. Further, the user can request consumables such as paper, toner, and ink used for printing by using a print material determination application 201 included in the PC 2. In the present embodiment, the PC 2 functions as an example of an information processing apparatus that executes the print material determination application 201.

The cloud storage 1 stores a print permission/prohibition condition, a usage amount, and a settlement status. In the present embodiment, the print permission/prohibition condition is a condition that is set for each company and according to which determination is made as to whether a print material is permitted to be printed as an internal document. In the present embodiment, the usage amount is a usage amount of consumables for printing an internal document for each employee of a company. The company is an example of an entity including any organization such as a business, government, or educational unit. In the present embodiment, the settlement status is a status of settlement of a print cost according to the usage amount for each employee. The print cost is an example of a requested amount. The settlement status is an example of a completion status of a requested amount of the printing based on the usage amount for each employee.

When the user wants to print a personal document, the user directly instructs a printer driver 202 of the printer 3 for personal use to perform printing, and the usage amount of the consumables used for printing the personal document is not managed at the cloud storage 1.

When the user wants to print an internal document, the user performs printing via the print material determination application 201. In this case, when the print material determination application 201 determines that a document to be printed (print material) is an internal document, the usage amount of the consumables for printing is managed in association with each user at the cloud storage 1. By contrast, when the print material determination application 201 determines that the print material is not an internal document, the print material determination application displays a message indicating that printing is prohibited, to prompt the user to print the print material as a personal document.

In the present embodiment, a logic (print permission/prohibition condition) for determining whether the print material is an internal document or a personal document is managed on the cloud storage 1 in association with each company. Each time a printing job is executed via the print material determination application 201, the print material determination application 201 acquires a print permission/prohibition condition from the cloud storage 1 and determines whether the print material is an internal document or a personal document according to the acquired print permission/prohibition condition. In other words, when executing the printing job of the print material, the print material determination application 201 determines whether the print material is permitted to be printed as an internal document according to the print permission/prohibition condition stored in the cloud storage 1.

The print permission/prohibition condition according to which determination as to whether a print material is an internal document or a personal document can be set for each company. For example, at least one of the following print permission/prohibition conditions can be set.

Print permission/prohibition condition 1: Determination is made as to whether a print material is in a format specified by each company, for example, whether the print material includes a company's logo or the like.

Print permission/prohibition condition 2: Determination is made as to whether printing of the Internet page is prohibited.

Print permission/prohibition condition 3: Determination is made as to whether a print material includes a banned word, for example, whether a print material includes a word inappropriate for business.

Print permission/prohibition condition 4: Determination is made as to whether an amount of information of a print material is extremely small or large, for example, whether excessive paper cost is to be billed by printing a large amount of black-and-white pages. Whether it is a large amount of pages is determined based on a reference amount of page that is previously set. For example, determination is made as to whether an amount of information of the print material per page exceeds a threshold value that is set in advance.

When the print material determination application 201 determines that the print material is permitted to be printed as an internal document, the print material determination application 201 executes the printing job of the print material and stores a usage amount by the printing job in the cloud storage 1. In other words, by performing printing via the print material determination application 201, the print material determination application 201 provides a mechanism for distinguishing whether a print material is an internal document or a personal document, and a mechanism for accounting for a print cost of used consumables when the determination result indicates that the print material is an internal document. As a result, an employee can request an employer for consumables used for printing, and the employer can pay an appropriate fee based on the request. Further, with regard to a mechanism for distinguishing whether a print material is an internal document or a personal document, one or more desired print permission/prohibition conditions can be set. Accordingly, a print permission/prohibition condition that matches a billing condition of each company can be set.

Furthermore, the print material determination application 201 bills a cost for printing according to a usage amount stored in the cloud storage 1 and stores a settlement status of the cost for printing in the cloud storage 1. The billing of the cost for printing according to the usage amount stored in the cloud storage 1 is an example of providing a record relating to the requested amount of the printing according to the usage amount stored in the cloud storage 1. Further, the storing of the settlement status of the cost for printing in the cloud storage 1 is an example of storing the completion status of the requested amount in the cloud storage.

In the present embodiment, the print material determination application 201 may bill the company for cost of printing according to an input from the user.

Furthermore, when print material determination application 201 determines that the print material is prohibited to be printed as an internal document, the print material determination application 201 may display a message indicating that the print material is a material that is not permitted to be printed as an internal document of which print cost can be billed. In this case, the print material determination application 201 may execute a printing job of the print material, via the printer driver 202, to the printer 3 registered in advance.

Alternatively, when the print material determination application 201 determines that the print material is prohibited to be printed as an internal document, the print material determination application 201 may display a message that allows selection of whether to execute the printing job of the print material to the printer 3 registered in advance. When execution of the printing job of the print material to the printer 3 registered in advance is selected, the print material determination application 201 executes the printing job of the print material to the printer 3 registered in advance via the printer driver 202. By contrast, when execution of the printing job of the print material to the printer 3 registered in advance is not selected, the print material determination application 201 ends the printing job of the print material.

Furthermore, when the usage amount exceeds a certain amount, the print material determination application 201 can automatically order consumables used for printing the print material.

Furthermore, the print material determination application 201 may transmit image data used for printing the print material to the cloud storage 1. Specifically, when the print material determination application 201 determines that the print material is permitted to be printed as an internal document, the print material determination application 201 uploads image data according to which the printing has been performed to the cloud storage 1. As a result, an administrator of the company can judge, as needed, appropriateness of the determining the image data (printed document) uploaded to the cloud storage 1 as an internal document. In this case, the print material determination application 201 may adjust an image quality of the image data to be transmitted to the cloud storage 1. As a result, a usage fee of the cloud storage 1 for storing image data in the cloud storage 1 can be adjusted.

In this case, the cloud storage 1 stores image data received from the print material determination application 201 in association with each employee. As a result, a person in charge of payment of the employer can prevent or reduce the user's fraudulent receipt of payment. Further, the cloud storage 1 may omit image data other than a fixed (predetermined) page from image data received from the print material determination application 201 and store the image data from which the other image data have been omitted. As a result, the usage fee of the cloud storage 1 for storing image data can be adjusted. For example, the cloud storage 1 may randomly determine image data to be omitted from image data received from the print material determination application 201.

Figure 2:
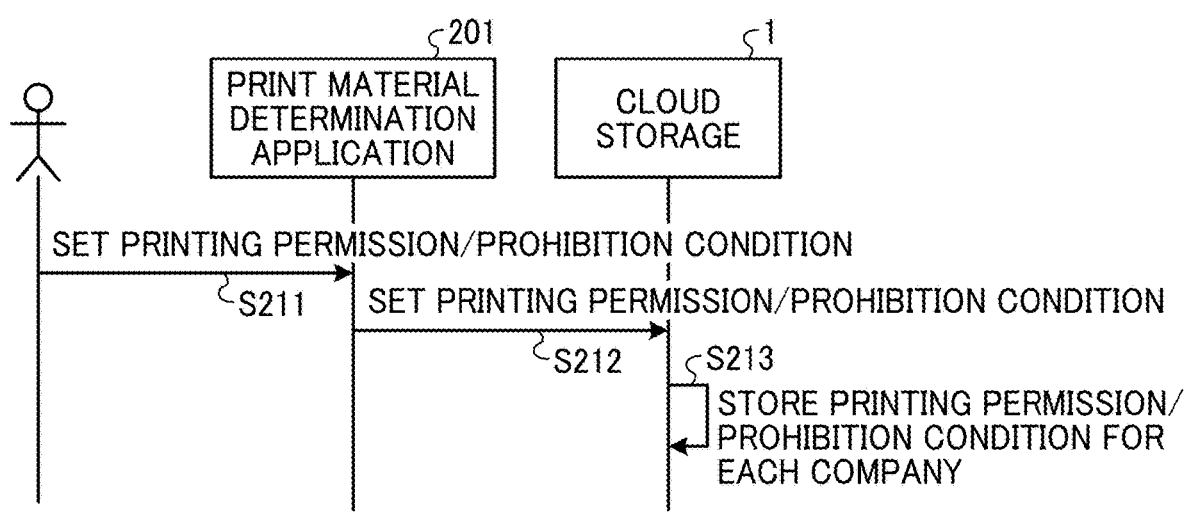
FIG. 2 is a sequence diagram illustrating an example of a flow of an operation of setting a print permission/prohibition condition by the print management system, according to an embodiment of the present disclosure.

FIG. 2 is a sequence diagram illustrating an example of a flow of an operation of setting a print permission/prohibition condition by the print management system, according to the present embodiment. In the present embodiment, a user configures settings of the print permission/prohibition condition via the print material determination application 201 (step S211).

The print material determination application 201 configures the settings of the print permission/prohibition condition to the cloud storage 1 (step S212). The cloud storage 1 stores the print permission/prohibition condition in association with each company (step S213). The stored print permission/prohibition condition is referenced when printing is performed via the print material determination application 201, and is used to determine whether a print material is permitted to be printed as an internal document.

Figure 3:
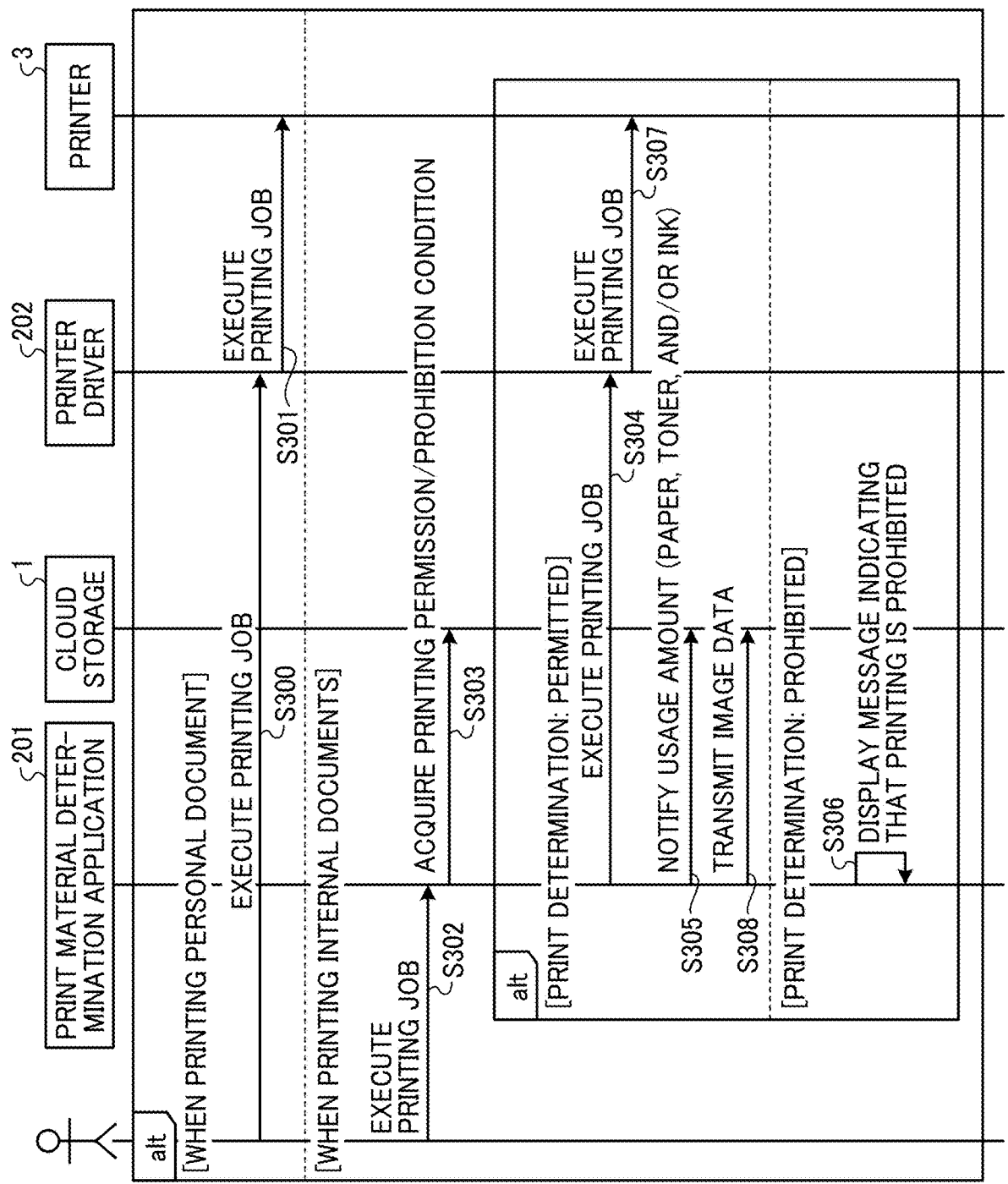
FIG. 3 is a sequence diagram illustrating an example of a flow of a printing operation performed in response to a user's request by the print management system, according to an embodiment of the present disclosure.

FIG. 3 is a sequence diagram illustrating an example of a flow of a printing operation performed in response to a user's request by the print management system, according to the present embodiment. In a case of printing a personal document, i.e., in a case of printing a document for which the user determines that the user does not have to bill a print cost, the user directly requests the printer driver 202 corresponding to the printer 3 that the user privately owns to execute a printing job in a known manner (step S300). The printer driver 202 executes the printing job (step S301).

By contrast, in a case of printing an internal document, i.e., in the case of printing a document for which consumables such as paper, toner, or ink used for the printing is to be billed since the document is used for business, the printing is performed via the print material determination application 201. In this case, the user designates the print material determination application 201 on a driver selection screen for a print material, to request the print material determination application 201 to execute the printing job (step S302). The print material determination application 201 acquires the print permission/prohibition condition from the cloud storage 1 (step S303). The print material determination application 201 determines whether the print material is permitted to be printed as an internal document on the basis of the acquired print permission/prohibition condition.

When the print material determination application 201 determines that the print material is permitted to be printed as an internal document, the print material determination application 201 requests the printer driver 202 that is set in advance to execute the printing job (step S304). The printer driver 202 that receives the request executes the printing job (step S307). Further, after the printing of the print material is completed, the print material determination application 201 notifies the cloud storage 1 of the consumption amount (usage amount) of consumables such as paper, toner, and ink used for the printing (step S305). When the print material determination application 201 determines that the print material is permitted to be printed as an internal document, the print material determination application 201 transmits image data used in printing the print material to the cloud storage 1 (step S308). The cloud storage 1 manages (stores) the image data received from the print material determination application 201 in association with each employee. The image data stored in the cloud storage 1 may be checked by a person in charge of payment of the employer as needed. In the print management system according to the present embodiment, in a case that the print permission/prohibition condition is leaked, there is a possibility that a fraudulent request for printing of image data is made by a user. However, by storing image data in the cloud storage 1 and prohibiting a user from performing an operation (deletion or editing) on the stored image data, a fraudulent billing for printing image data can be prevented. In the present embodiment, examples of the fraudulent billing by the user includes printing a large amount of blank image data except for the first page, i.e., performing printing in a state in which paper can be reused, and the number of sheets of paper used for such the printing is excessively billed. When the print material determination application 201 determines that the print material is prohibited to be printed as an internal document, the print material determination application 201 displays a print prohibition message indicating that the print material is inappropriate to be printed as an internal document (step S306).

The cloud storage 1 manages (stores) the print permission/prohibition condition in association with each company, and manages the amount of paper used, the amount of toner or ink used, and the state of whether payment has been made in association with each employee of each company.

Figure 4:
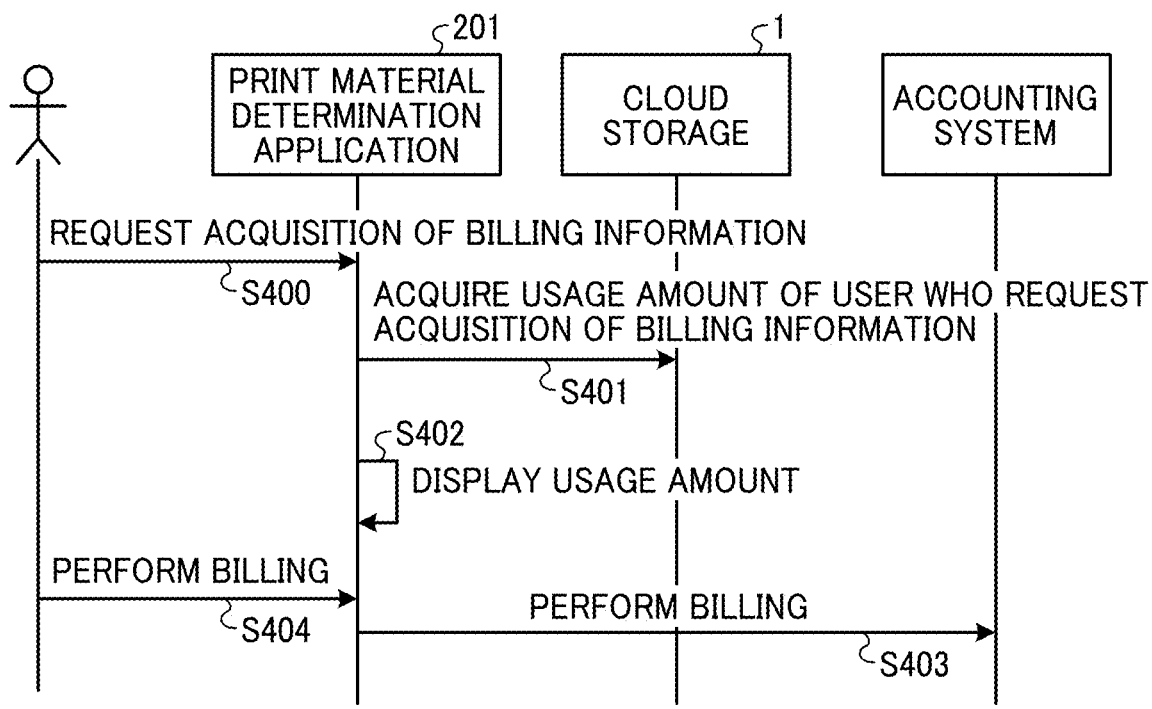
FIG. 4 is a sequence diagram illustrating an example of a flow of a billing operation of a print cost in response to a user's request performed by the print management system, according to an embodiment of the present disclosure.

FIG. 4 is a sequence diagram illustrating an example of a flow of a billing operation of a print cost performed in response to a user's request by the print management system, according to the present embodiment. In the present embodiment, a user can bill a print cost from the print material determination application 201 at the timing of billing a printing cost (e.g., monthly data calculation date).

When a user requests acquisition of billing information (step S400), the print material determination application 201 acquires the usage amount (e.g., the usage amount of consumables such as paper, toner, or ink used for printing) stored in association with the user from the cloud storage 1 (step S401), and displays the acquired usage amount and the amount (print cost) that can be billed based on the usage amount (step S402). When the user finds no problem with the displayed contents, the user performs an operation for billing the print cost (step S404). The print material determination application 201 performs an operation of billing an accounting system of each company for the print cost (step S403).

Figure 5:
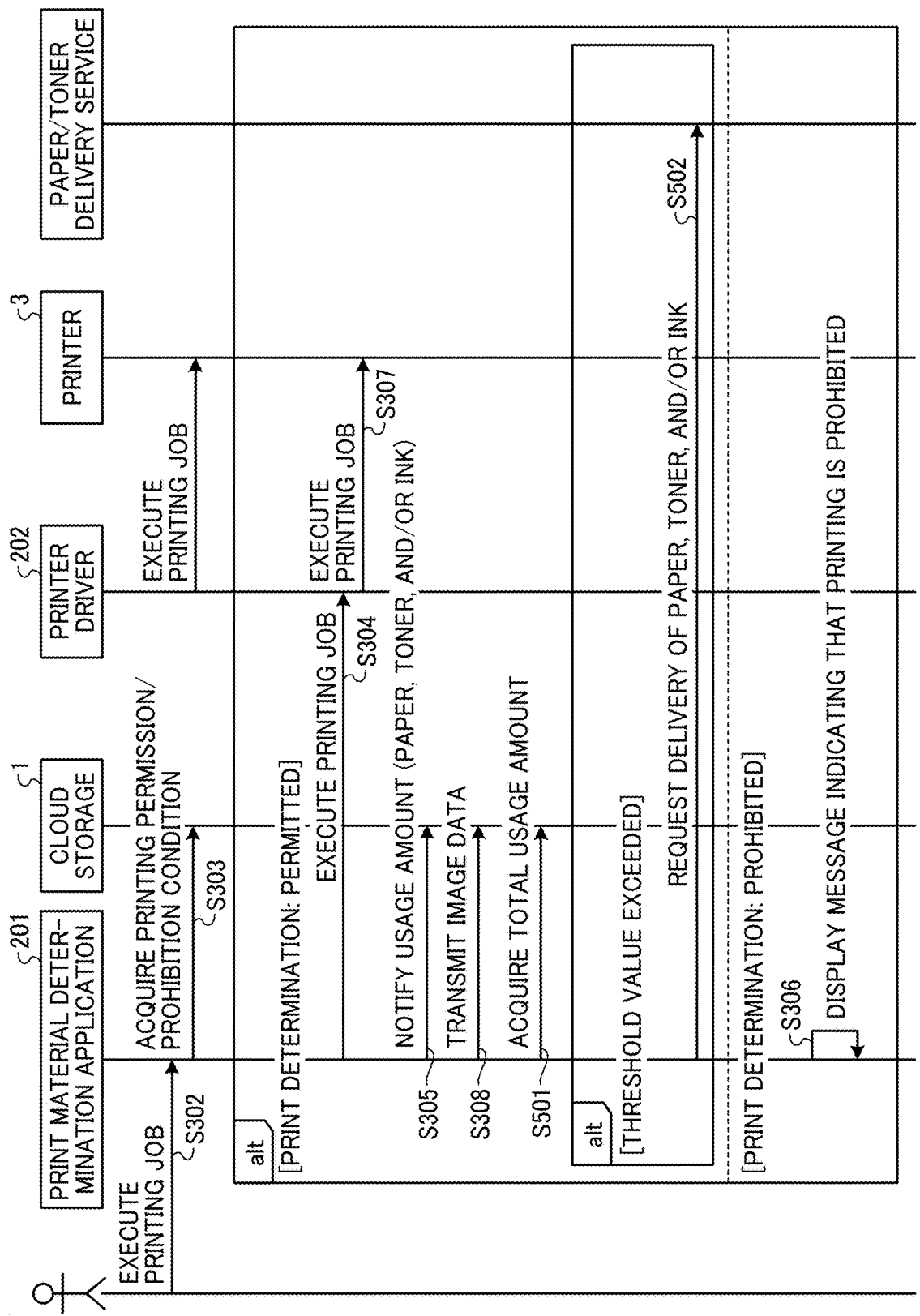
FIG. 5 is a sequence diagram illustrating an example of a flow of an operation of automatically delivering consumables performed by the print management system, according to an embodiment of the present disclosure.

FIG. 5 is a sequence diagram illustrating an example of a flow of an operation of automatically delivering consumables by the print management system, according to the present embodiment. In the following, redundant descriptions of processes that are same as those of FIG. 3 are omitted.

In the present embodiment, the print management system can also perform automatic ordering of consumables such as paper, toner, or ink when the usage amount of consumables such as paper, toner, or ink by a user exceeds a certain threshold value.

The cloud storage 1 manages the usage amount of consumables for printing via the print material determination application 201. Accordingly, the print material determination application 201 acquires a sum of the number of used papers and the usage amount of consumables such as toner or ink. In the following description, such the sum may be referred to as a "total usage amount" (step S501). However, the accurate total usage amount of toner or ink sometimes cannot be acquired. When the acquired total usage amount exceeds a certain threshold value, the print material determination application 201 automatically requests delivery of consumables (step S502).

Figure 6:
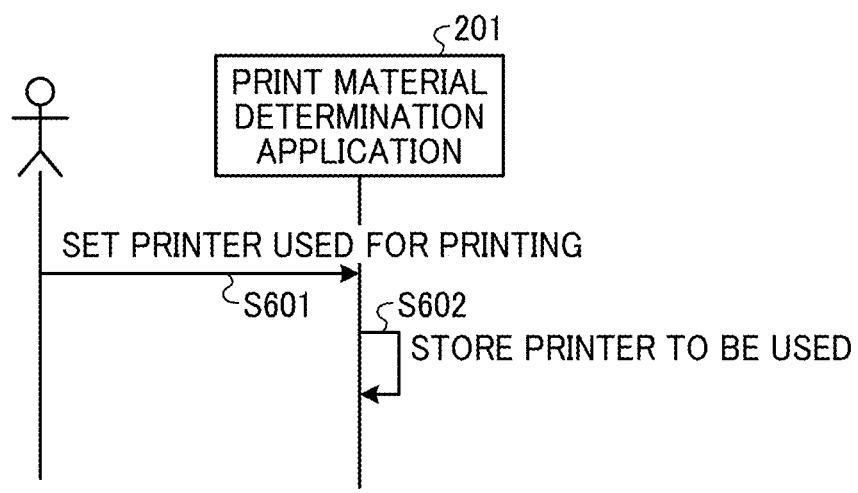
FIG. 6 is a sequence diagram illustrating an example of a flow of an operation of registering a printer used for printing performed by the print management system, according to an embodiment of the present disclosure.

FIG. 6 is a sequence diagram illustrating an example of a flow of an operation of registering a printer used for printing by the print management system, according to the present embodiment. When the print material determination application 201 determines that a print material is a personal document, the user registers the printer 3 to be used for printing in the print material determination application 201 in advance (step S601). The print material determination application 201 holds information of the printer 3 set by the user (step S602). Thus, the printer 3 registered in advance is used in printing when a print material is identified as a personal document.

Figure 7:
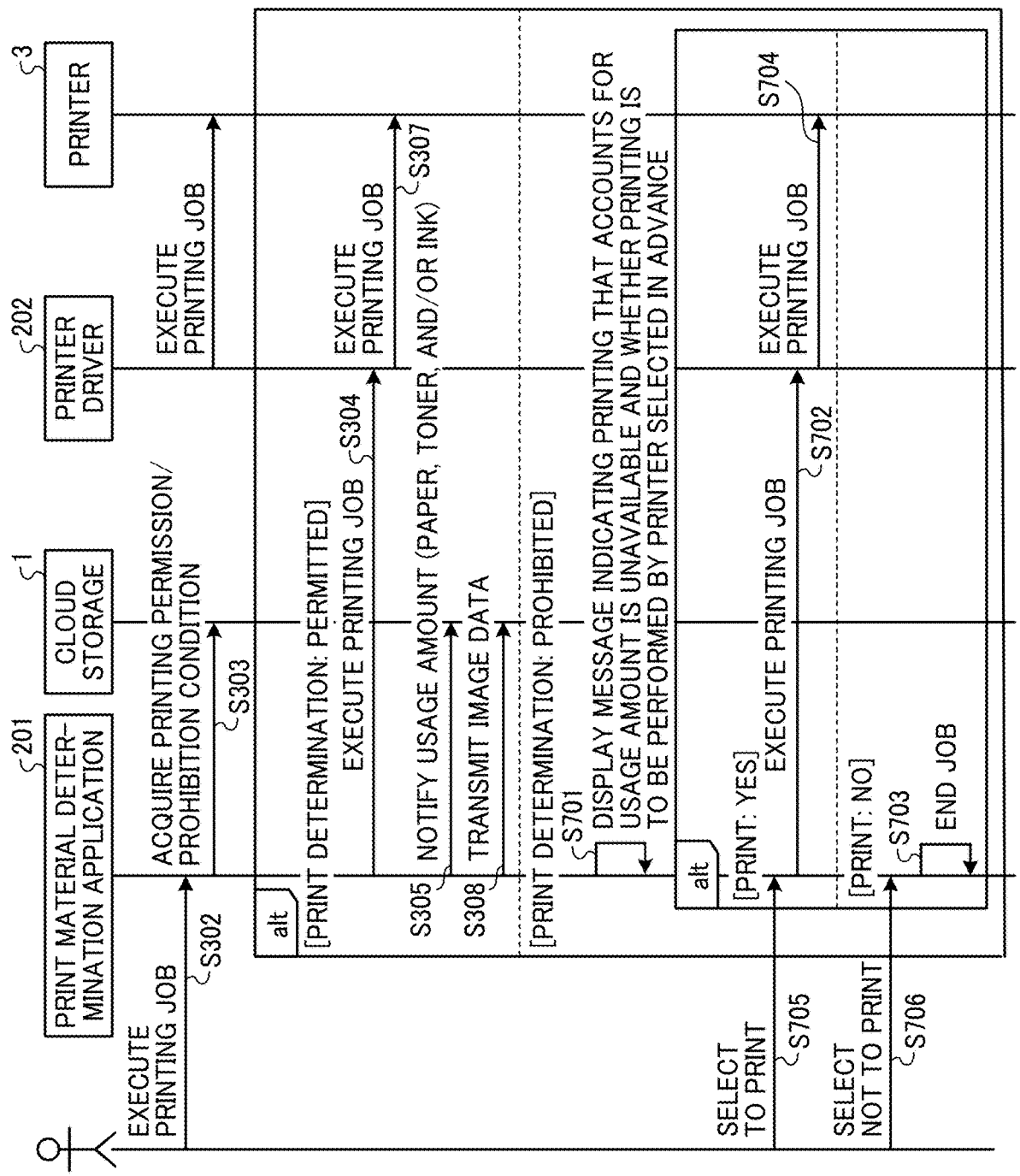
FIG. 7 is a sequence diagram illustrating an example of a flow of an operation of printing in a case where a print material is identified as a personal document performed by the print management system, according to an embodiment of the present disclosure.

FIG. 7 is a sequence diagram illustrating an example of a flow of an operation of printing in a case where a print material is identified as a personal document by the print management system, according to the present embodiment. In the following, redundant descriptions of processes that are same as those of FIG. 3 are omitted.

In the present embodiment, when the print material determination application 201 determines that the print material is prohibited to be printed as an internal document, the print material determination application 201 determines whether the printer 3 that is set in advance is present. When the printer 3 that is set in advance is present, the print material determination application 201 displays a message that allows selection of whether to execute a printing job to the printer 3 that is registered in advance without calculating the usage amount (step S701).

When the user selects executing of the printing job of the print material with the printer 3 registered in advance (step S705), the print material determination application 201 requests the printer driver 202 to execute the printing job (step S702). The printer driver 202 that receives the request executes the printing job of the print material to the printer 3 registered in advance (step S704). Since a document printed here is not to be billed, the document is not used at the time of billing. By contrast, when the user selects not to execute the printing job of the print material to the printer 3 registered in advance (step S706), the print material determination application 201 ends the printing job (step S703).

Thus, according to the print management system of the present embodiment, since an employee can bill an employer for consumables used for printing, the employer can pay an appropriate fee based on the user's request.

The program executed at the PC 2 according to the present embodiment is preinstalled and provided in, for example, a read only memory (ROM). The program executed by the PC 2 according to the present embodiment may be stored in a computer readable storage medium, such as a compact disc read only memory (CD-ROM), a flexible disk (FD), a compact disc recordable (CD-R), and a digital versatile disc (DVD), in an installable or executable file format for distribution.

Further, the program executed by the PC 2 according to the present embodiment can be stored in a computer connected to a network such as the internet and downloaded through the network. Furthermore, the program executed by the PC 2 according to the present embodiment can be provided or distributed through a network such as the Internet.

The program executed by the PC 2 according to the present embodiment is in a modular configuration including the above-described units (e.g., the print material determination application 201 and the printer driver 202). As hardware, a central processing unit (CPU) reads the program from the above-mentioned ROM and executes the program, thereby loading the above respective units onto a main memory, and the print material determination application 201 and the printer driver 202 are implemented on the main memory.

Even in a case in which a printer owned by an individual is used, an employer has to bear the costs for printing internal documents. However, print management systems according to the related art do not have a mechanism for determining whether a printed document is an internal document or a personal document. For this reason, an employee has difficulty in correctly charging the costs of consumables such as paper, toner, or ink used for printing. An employer has difficulty in determining the appropriateness of the amount billed by the employee. Further, even if print management systems have a mechanism for determining the appropriateness of determining whether a printed document is an internal document or a personal document, the individual may avoid a determination logic for determining whether a printed document is an internal document or a personal document and make a fraudulent expense report.

According to one or more embodiments of the present disclosure, when an employee prints internal documents with the employee's privately owned printer, the cost of consumables such as paper, ink or toner used for the printing is correctly billed.

Aspects of the present disclosure are, for example, as follows.

According to Aspect 1, a print management system includes an information processing apparatus and a cloud storage. The information processing apparatus executes a print material determination application.

The cloud storage stores a print permission/prohibition condition that is set for each company and indicates whether a print material is permitted to be printed as an internal document, a usage amount of consumables used in printing the internal document for each employee of the each company, and a settlement status of a print cost according to the usage amount for the each employee.

In response to request to execute a printing job of the print material, the print material determination application determines whether the print material is permitted to be printed as the internal document according to the print permission/prohibition condition stored in the cloud storage. When the print material determination application determines that the print material is permitted to be printed as the internal document, the print material determination application executes the printing job of the print material. The print material determination application stores the usage amount by the printing job in the cloud storage. The print material determination application bills a print cost according to the usage amount stored in the cloud storage, and stores a settlement status of the print cost in the cloud storage.

According to Aspect 2, in the print management system of Aspect 1, the print material determination application bills the each company for the print cost according to an input from a user.

According to Aspect 3, in the print management system of Aspect 1 or Aspect 2, the print material determination application automatically orders consumables used for printing the print material when the usage amount exceeds a certain amount.

According to Aspect 4, in the print management system of any one of Aspect 1 to Aspect 3, when the print material determination application determines that the print material is prohibited to be printed as the internal document, the print material determination application displays a message indicating that the print material is not a material that is permitted to printed as the internal document and the print cost can be billed, and executes the printing job of the print material to a printer registered in advance.

According to Aspect 5, in the print management system of Aspect 4, when the print material determination application determines that the print material is prohibited to be printed as the internal document, the print material determination application displays a message that allows selection of whether to execute the printing job of the print material to the printer registered in advance, and when execution of the printing job of the print material to the printer registered in advance is selected, the print material determination application executes the printing job of the print material to the printer registered in advance.

According to Aspect 6, in the print management system of Aspect 5, the print material determination application ends the printing job of the print material when no execution of the printing job of the print material to the printer registered in advance is selected.

According to Aspect 7, in the print management system of any one of Aspect 1 to Aspect 6, the print permission/prohibition condition includes at least one of: whether the print material is in a format specified by the each company; whether printing of the Internet page is prohibited; whether the print material includes a banned word; and whether an amount of information of the print material is extremely small or large.

According to Aspect 8, in the print management system of any one of Aspect 1 to 7, the print material determination application transmits image data used in printing the print material to the cloud storage.

The cloud storage stores the image data received from the print material determination application in association with the each employee.

According to Aspect 9, in the print management system of Aspect 8, the print material determination application further adjusts an image quality of the image data to be transmitted to the cloud storage.

According to Aspect 10, in the print management system according to Aspect 8 or Aspect 9, the cloud storage further omits other image data than image data of a fixed page from the image data.

According to Aspect 11, in the print management system of Aspect 10, the cloud storage further randomly determines a page to be omitted from the image data.

According to Aspect 12, a print management method is performed by an information processing apparatus.

The method includes, in response to a request to execute a printing job of a print material, determining whether the print material is permitted to be printed as an internal document according to a print permission/prohibition condition stored in a cloud storage, the print permission/prohibition condition being set for each company and indicating whether the print material is permitted to be printed as the internal document.

The method includes, when the determining determines that the print material is permitted to be printed as the internal document, executing the printing job of the print material.

The method includes storing a usage amount of consumables by the printing job in the cloud storage.

The method includes billing a print cost according to the usage amount stored in the cloud storage.

The method includes storing a settlement status of the print cost in the cloud storage.

According to Aspect 13, a program causes a computer to perform a method. The method includes, in response to a request to execute a printing job of a print material, determining whether the print material is permitted to be printed as an internal document according to a print permission/prohibition condition stored in a cloud storage, the print permission/prohibition condition being set for each company and indicating whether the print material is permitted to be printed as the internal document.

The method includes, when the determining determines that the print material is permitted to be printed as the internal document, executing the printing job of the print material.

The method includes storing a usage amount of consumables by the printing job in the cloud storage.

The method includes billing a print cost according to the usage amount stored in the cloud storage.

The method includes storing a settlement status of the print cost in the cloud storage.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A print management system, comprising:
a cloud storage server including a memory that stores a print permission/prohibition condition that is set for each entity and indicates whether a print material is permitted/prohibited to be printed as an internal document, a usage amount of consumables used in printing the internal document for each employee of the each entity, and a completion status of a requested amount of the printing based on the usage amount for the each employee; and
an information processing apparatus comprising circuitry configured to execute a print material determination application to:
determine whether the print material is permitted/prohibited to be printed as the internal document according to the print permission/prohibition condition stored in the cloud storage server in response to a request to execute a printing job of the print material;
execute the printing job of the print material according to a result of determination indicating that the print material is permitted to be printed as the internal document;
store the usage amount by the printing job in the cloud storage server;
provide a record relating to the requested amount of the printing according to the usage amount stored in the cloud storage server; and
store the completion status of the requested amount of the printing in the cloud storage server.

2. The print management system of claim 1, wherein the print material determination application configures the circuitry to provide, for the each entity, the record relating to the requested amount of the printing according to an input from a user.

3. The print management system of claim 1, wherein the print material determination application configures the circuitry to automatically generate an order of consumables used in printing the print material in response to the usage amount exceeding a certain amount.

4. The print management system of claim 1, wherein, based on a determination that the print material is prohibited to be printed as the internal document, the print material determination application configures the circuitry to display a message indicating that the print material is a material that is prohibited to be printed as the internal document and for which the record relating to the requested amount of the printing is failed to be provided, and executes the printing job of the print material with a printer registered in advance.

5. The print management system of claim 4, wherein, based on the determination that the print material is prohibited to be printed as the internal document, the print material determination application configures the circuitry to display a message prompting a user to select whether to execute the printing job of the print material with the printer registered in advance, and
when the selection indicates execution of the printing job of the print material to the printer registered in advance, the print material determination application executes the printing job of the print material to the printer registered in advance.

6. The print management system of claim 5, wherein the print material determination application configures the circuitry to end the printing job of the print material when the selection indicates no execution of the printing job of the print material with the printer registered in advance.

7. The print management system of claim 1, wherein the print permission/prohibition condition indicates at least one of:
whether the print material is in a format specified by the each entity;
whether printing of the Internet page is prohibited;
whether the print material includes a banned word; and whether an amount of information of the print material per page exceeds a threshold value that is set in advance.

8. The print management system of claim 1, wherein
the print material determination application configures the circuitry to transmit image data used in printing the print material to the cloud storage server comprising the memory, and
the cloud storage server stores the image data received for each employee.

9. The print management system of claim 8, wherein
the print material determination application configures the circuitry to adjust an image quality of the image data to be transmitted to the cloud storage server.

10. The print management system of claim 8, wherein
the cloud storage server comprises circuitry configured to omit other image data than image data of a fixed page from the image data.

11. The print management system of claim 10, wherein
the circuitry of the cloud storage server randomly determines a page to be omitted from the image data.

12. A print management method performed by an information processing apparatus, the method comprising:
determining whether a print material is permitted/prohibited to be printed as an internal document according to a print permission/prohibition condition stored in a cloud storage server including a memory, the print permission/prohibition condition being set for each entity and indicating whether the print material is permitted/prohibited to be printed as the internal document, in response to a request to execute a printing job of the print material;
executing the printing job of the print material, when the determining determines that the print material is permitted to be printed as the internal document;
storing a usage amount of consumables by the printing job in the cloud storage server;
providing a record relating to a requested amount of printing according to the usage amount stored in the cloud storage server; and
storing a completion status of the requested amount of the printing in the cloud storage server.

13. A non-transitory computer-executable medium storing a program causing a computer to perform a method, the method comprising:
determining whether a print material is permitted/prohibited to be printed as an internal document according to a print permission/prohibition condition stored in a cloud storage server including a memory, the print permission/prohibition condition being set for each entity and indicating whether the print material is permitted/prohibited to be printed as the internal document, in response to a request to execute a printing job of the print material;
executing the printing job of the print material, when the determining determines that the print material is permitted to be printed as the internal document;
storing a usage amount of consumables by the printing job in the cloud storage server;
providing a record relating to a requested amount of printing according to the usage amount stored in the cloud storage server; and
storing a completion status of the requested amount of the printing in the cloud storage server.

14. The print management system of claim 1, wherein the information processing apparatus is configured to upload the print material in the form of image data to the cloud storage server, and
wherein the cloud storage server is configured to store the image data in the memory to allow a user to determine whether the image data should be designated as an internal document.

* * * * *